United States Patent
Nakao

(10) Patent No.: US 7,480,932 B2
(45) Date of Patent: Jan. 20, 2009

(54) AUTHENTICATION INFORMATION PROCESSING METHOD, PROGRAM, AND DEVICE

(75) Inventor: Makiko Nakao, Nagoya (JP)

(73) Assignee: Fujitsu Limited, Kawasaki (JP)

( * ) Notice: Subject to any disclaimer, the term of this patent is extended or adjusted under 35 U.S.C. 154(b) by 487 days.

(21) Appl. No.: 11/064,976

(22) Filed: Feb. 25, 2005

(65) Prior Publication Data

US 2005/0149763 A1 Jul. 7, 2005

Related U.S. Application Data

(63) Continuation of application No. PCT/JP03/00419, filed on Jan. 20, 2003.

(51) Int. Cl.
*H04L 9/32* (2006.01)
(52) U.S. Cl. .................... 726/2; 726/3; 726/6
(58) Field of Classification Search ............... 713/168, 713/183; 726/2–9, 16, 20
See application file for complete search history.

(56) References Cited

U.S. PATENT DOCUMENTS

| 5,559,505 A * | 9/1996 | McNair .................... 340/5.28 |
| 5,606,663 A | 2/1997 | Kadooka | |
| 6,731,731 B1 * | 5/2004 | Ueshima .................... 379/196 |

FOREIGN PATENT DOCUMENTS

| JP | 03-063865 A | 3/1991 |
| JP | 05-035677 A | 2/1993 |
| JP | 05-204766 A | 8/1993 |
| JP | 09-212723 A | 8/1997 |
| JP | 11-259425 | 9/1999 |
| JP | 2001-202334 A | 7/2001 |
| JP | 2002-197024 A | 7/2002 |

OTHER PUBLICATIONS

Lotus Kabushiki Kaisha, "Lotus Notes Domino 5.0 System Kanrisha Guide 1-System Setteihen/Network Settei Guide", Softbank Publishing Inc., p. 20, Jun. 14, 1999.
Tsuyoshi, Kitagawa, "Database Security e Business-jidai no Database Security Kyoka no Taisaku", DB Magazine, vol. 10, No. 9, Kabushiki KaishaShoeisha, pp. 53-65, Nov. 1, 2000.

* cited by examiner

*Primary Examiner*—Hosuk Song
(74) *Attorney, Agent, or Firm*—Staas & Halsey LLP

(57) ABSTRACT

An entry of authentication information is accepted. The accepted authentication information and previously set authentication information are compared. Furthermore, according to the result of the comparison between the accepted authentication information and the previously set authentication information, an degree of error between the accepted authentication information and the previously set authentication information is decided. According to the decided degree of error, it is decided how many times the authentication information can be re-entry.

15 Claims, 12 Drawing Sheets

FIG. 4

[DEGREE-OF-DIFFICULTY TABLE] 1

| ENTERED PASSWORD VALUE (1a) | DEGREE OF DIFFICULTY (0-LOWEST, 10-HIGHEST) (1b) | INITIAL NUMBER OF RE ENTRIES (1c) |
|---|---|---|
| SINGLE CHARACTER | 0 | 2 |
| SAME LETTERS ONLY | 1 | 3 |
| SAME NUMERALS ONLY | 1 | 3 |
| COMBINATION OF EIGHT OR MORE NUMERALS AND LETTERS | 5 | 5 |
| ETC. .. .. | | |
| MAXIMUM NUMBER OF CHARACTERS OF COMBINATION OF NUMERALS AND LETTERS | 10 | 10 |

FIG. 5

[INITIAL EXPIRATION DATE SETTING TABLE] 2

| DEGREE OF DIFFICULTY (0-LOWEST, 10-HIGHEST) | EXPIRATION DATE |
|---|---|
| 0 | ONE WEEK |
| 1 | ONE MONTH |
| 5 | SIX MONTHS |
| ETC. . . | . . |
| 10 | ONE YEAR |

FIG. 6

USER DATA TABLE

| USER NAME | DEGREE OF DIFFICULTY | EXPIRATION DATE | INITIAL NUMBER OF PERMITTED RE-ENTRIES | PASSWORD |
|---|---|---|---|---|
| A | 5 | 03.06.30 | 5 | fro439us |
| B | 1 | 03.01.30 | 3 | 433 |
| ---- | ---- | ---- | ---- | ---- |

AUTHENTICATION INFORMATION PROCESSING METHOD, PROGRAM, AND DEVICE

This is a continuation of Application PCT/JP2003/000419, filed on Jan. 20, 2003.

BACKGROUND OF THE INVENTION

1. Field of the Present Invention

The present invention relates to authentication information processing techniques, and particularly to a technique for preventing breaking of authentication information for devices and software that require entry of authentication information.

2. Description of the Related Art

In general, when using a smart card that contains a built-in microprocessor for storing information, or an IC card that is capable of storing information (hereinafter, smart cards and IC cards are generically referred to as cards), a user is required to enter identification information of the user called a PIN (Personal Identification Number) in order to prevent unauthorized use by strangers.

Similarly, various kinds of devices, such as computers, or various kinds of software used in computers (Web pages, various kinds of applications, etc.), too, require entry of authentication information, such as passwords or ID numbers, in order to prevent unauthorized use by strangers.

The various kinds of devices and software accept incorrectly-entry of authentication information for a predetermined number of times in consideration of user's entry error. When incorrectly-entry of authentication information is executed into those devices or software over the predetermined number of times, the processing is executed that using of those devices or software become disabled thereafter.

However, even though such authentication information processing techniques for those devices and software set and use various forms of authentication information, there still remains the possibility that the authentication information may be broken criminally or the authentication information may be broken accidentally.

For example, when an authentication information processing techniques permits to input an unlimited number of times, it is at high risk of breaking the authentication information by malicious strangers. On the other hand, in an authentication information processing techniques, the problem is that mere entry error make the device or software impossible to use when the number of permitted re-entries is setting.

A technique for protecting passwords, a kind of authentication information, from being broken through such wrong entries or unauthorized use is known, which determines a level of error in which case a wrong password is entered and permits re-entry of the password (e.g., refer to Patent Document 1 "JP 11-259425 A") according to the error level is disclosed. Further, a technique for clearly distinguishing simple keystroke error and wrong entry (see Patent Document 2 "JP 9-212723 A", for example) is disclosed.

However, the technique of Patent Document 1 previously fixes the number of permitted re-entries, and when a password is determined to be totally different, then re-entry is not permitted and the power is cut off.

Also, concerning the technique of Patent Document 1, it is recently common that a user has a plurality of passwords according to use of devices and plurality of software requiring a password. We can well imagine that a user forget passwords careless according to the number of having passwords. Also, if a user is novice at operating the keyboard, it is more likely that the user enter a wrong password even when remembering the correct password.

From these viewpoints, it is very inconvenient for users that the various kinds of devices or software do not permit users to re-enter authentication information, such as passwords and become unavailable.

SUMMARY OF THE INVENTION

The present invention has been made in view of the circumstances described above, and has an object to provide an authentication information processing technique that protects authentication information from being broken and improves convenience of authorized users of the authentication information.

The present invention adopts the unit shown below to achieve the object.

That is, according to the present invention, an entry of authentication information is accepted. Then, in the present invention, the accepted authentication information and previously set authentication information are compared. Further, in the present invention, a degree of error between the accepted authentication information and the previously set authentication information is judged on the basis of a result of the comparison between the accepted authentication information and the previously set authentication information. Then, in the present invention, a number of permitted re-entries of the authentication information is determined in accordance with the judged degree of error.

Further, according to the present invention, an expiration date of the authentication information may be determined in accordance with the judged degree of error.

Further, in the present invention, the previously set authentication information and the entered authentication information are compared to determine the number of permitted re-entries meaning how many times entry error of authentication information is permitted, or the expiration date. Thus, according to the present invention, it is possible to effectively exclude unauthorized users who naturally tend to make a larger number of entry errors.

Further, in the present invention, a degree of difficulty of the authentication information is judged, an initial number of permitted re-entries of the authentication information may be determined in accordance with the degree of difficulty.

According to the present invention, when a user sets, for example, authentication information formed of a smaller number of characters, authentication information formed of a combination of numerical characters only, authentication information formed of a combination of alphabetic characters only, or authentication information using a plurality of the same alphabetic or numerical character, then the degree of difficulty of the authentication information is judged to be low and the initial number of permitted re-entries is set smaller, and with authentication information formed of a combination of a larger number of alphabetic and numerical characters, then the degree of difficulty of the authentication information is judged to be high and the initial number of permitted re-entries is set larger. Thus, according to the present invention, it is possible to enhance the security of the authentication information while keeping user convenience.

Further, in the present invention, an initial expiration date of the authentication information may be determined in accordance with the degree of difficulty of the authentication information judged in the step of judging the degree of difficulty.

For example, according to the present invention, on the basis of the above degree of difficulty of authentication information, the initial expiration date of authentication information with a lower degree of difficulty is set at an earlier date, and the initial expiration date of authentication information with a higher degree of difficulty is set at a distant date. According to the present invention, it is possible to reduce that the authentication information of which the degree of difficulty is low may be broken.

Further, in the present invention, the number of permitted re-entries of the authentication information may be determined in accordance with an accumulated number of entries of the authentication information.

For example, according to the present invention, on the basis of the accumulated number of entries of the authentication information, the level of skill of a user in operating devices and software that require entry of authentication information is judged. Thus, according to the present invention, it is possible to provide an authentication information processing technique that is easy to use even for inexperienced users who are not accustomed to handling of the authentication information.

Furthermore, in the present invention, the expiration date of the authentication information may be determined in accordance with the accumulated number of entries of the authentication information.

According to the present invention, the expiration date of authentication information is set to expire earlier when the user is unskilled, i.e., inexperienced. Thus, according to the present invention, a user, who once set easy authentication information, will set new, more difficult authentication information as the user gets more skilled, and then the security of the authentication information can be kept.

BRIEF DESCRIPTION OF THE DRAWINGS

FIG. 4 is an example of a data table used to determine the degree of difficulty of a password according to the first embodiment;

FIG. 5 is an example of a data table used to determine an initial expiration date of a password according to the first embodiment;

FIG. 6 is an example of a user data table of the first embodiment;

DESCRIPTION OF THE PREFERRED EMBODIMENTS

First Embodiment

Figure 1:
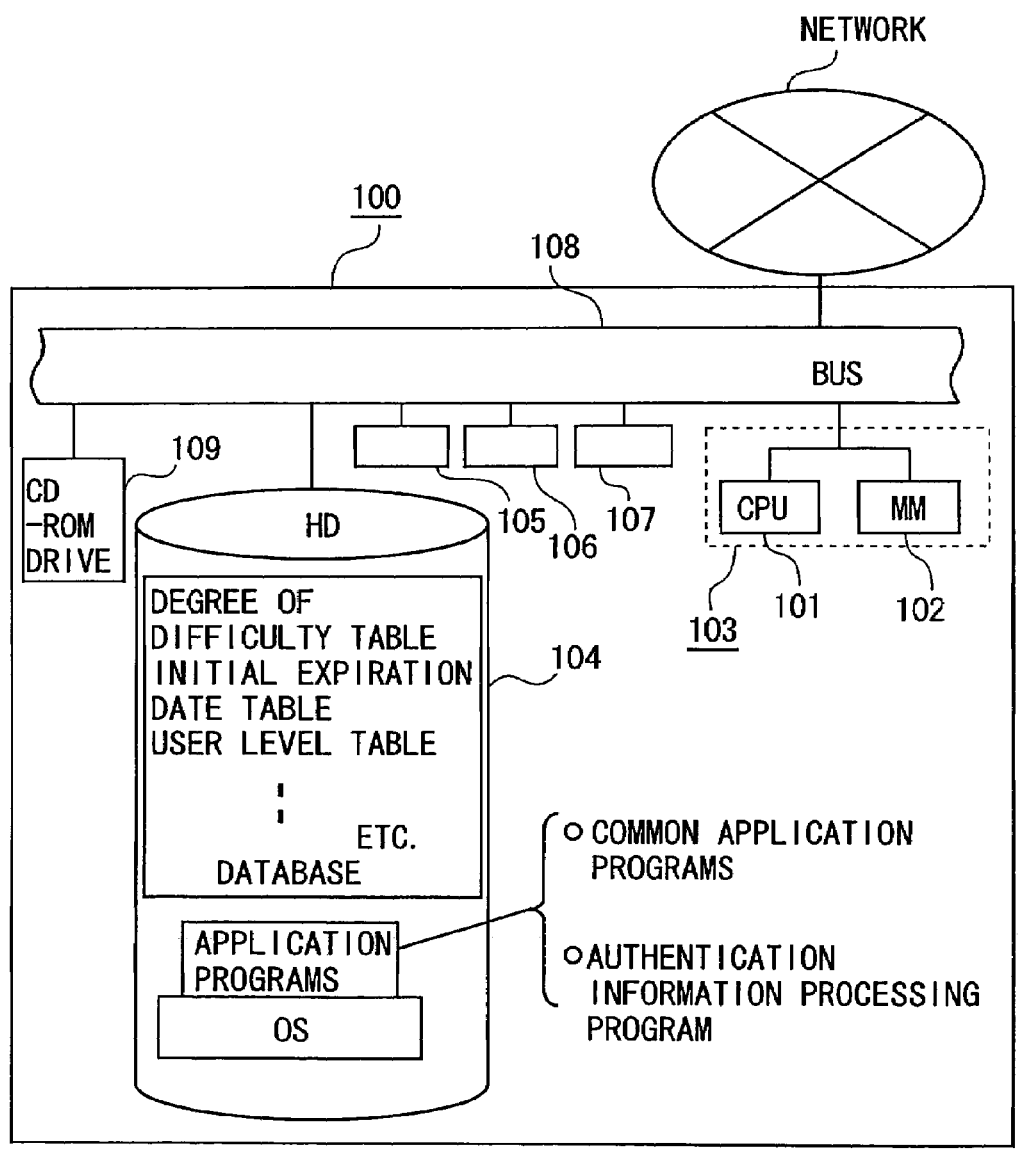
FIG. 1 is a view showing an example outlined configuration of a computer implementing an authentication information processing device according to a first embodiment of the present invention.

A first preferred embodiment of the present invention will be described below referring to the drawings.

An authentication information processing device according to the first embodiment of the present invention is described referring to FIGS. 1 to 10.

<Configuration of Device>

The authentication information processing device according to the embodiment is an information processing device, such as a computer and so on, in which an authentication information processing program for implementing an authentication information processing method of the present invention is introduced (installed).

In the description below, the embodiment illustrates processing of a password as an example of the authentication information required for use of the authentication information processing device.

FIG. 1 schematically shows an example outlined configuration of the authentication information processing device of the embodiment, where the authentication information processing device is denoted by reference numeral 100.

First, the authentication information processing device 100 has a processing unit 103 including a CPU (central processing unit) 101 and a main memory (MM) 102 and operating on the basis of application programs.

The processing unit 103 is connected with a storage device 104 through a bus 108. The storage device 104 is usually formed of a large-capacity storage medium, such as a hard disk device.

The storage device 104 contains an operating system (OS) installed therein in order that the authentication information processing device 100 normally functions.

The storage device 104 also contains other general application programs installed therein.

Also, in the storage device 104, an authentication information processing program executable by an information processing device, such as a computer and so on, created to implement the authentication information processing method of the present invention, is installed.

These programs are provided to the authentication information processing device 100 in the form stored in a storage medium not shown, such as a CD-ROM and so on, and installed in the storage device 104 in an executable form, through such as a CD-ROM drive device 109 shown in FIG. 1. The authentication information processing device 100 may receive the programs through a network, install them in the storage device 104, and load them into the main memory 102. Alternatively, the authentication information processing device 100 may load the received programs directly into the main memory 102.

The CPU 101 loads (reads) the authentication information processing program from the storage device 104 into the main memory 102 according to need, and sequentially executes the program to implement an authentication information setting unit, an authentication information entering unit, an authentication information comparing unit, a permitted re-entry number determining unit, a degree-of-difficulty judging unit, expiration date determining unit, a judgment unit, and an expiration date determining unit in the information processing device that implements the authentication information processing method of the present invention.

The storage device 104 contains a database required for the implementation of the authentication information processing method of the present invention. The various of data stored in the database are now described.

The database stores a degree-of-difficulty table which is a data table that, when a password is set, the device 100 uses to judge the degree of difficulty of the password. The database also stores an initial expiration date setting table which is a data table that, when a password is set, the device 100 uses to determine an initial expiration date of the password. Also, the database stores a user level table which is a data table that the device 100 uses to judge the level of experience of the password user.

The processing unit 103 of the authentication information processing device 100 is connected to input unit and output unit through the bus 108.

Examples of the input unit and output unit of the authentication information processing device 100 are shown below. First, an input device, such as a keyboard 107 or a mouse, by which a user enters various information, such as a password, is provided as input unit corresponding to password entering unit of the present invention. As for the output unit, output devices, such as a display 106 and a printer 105, are connected to the processing unit 103 through the bus 108.

<Process of Setting Password>

Next, a procedure for a password setting process according to the embodiment is described. This password setting process corresponds to processing performed by the authentication information setting unit, the permitted re-entry number determining unit, and the expiration date determining unit of the present invention. In the present invention, the term "expiration date" unit the date for which set authentication information can be authenticated in the device and the application software into which the authentication information is entered. The expiration date may be a combination of a date on which the authentication information is set and the number of days elapsing after that date. The expiration date may be represented as a date on which the validity expires.

Figure 2:
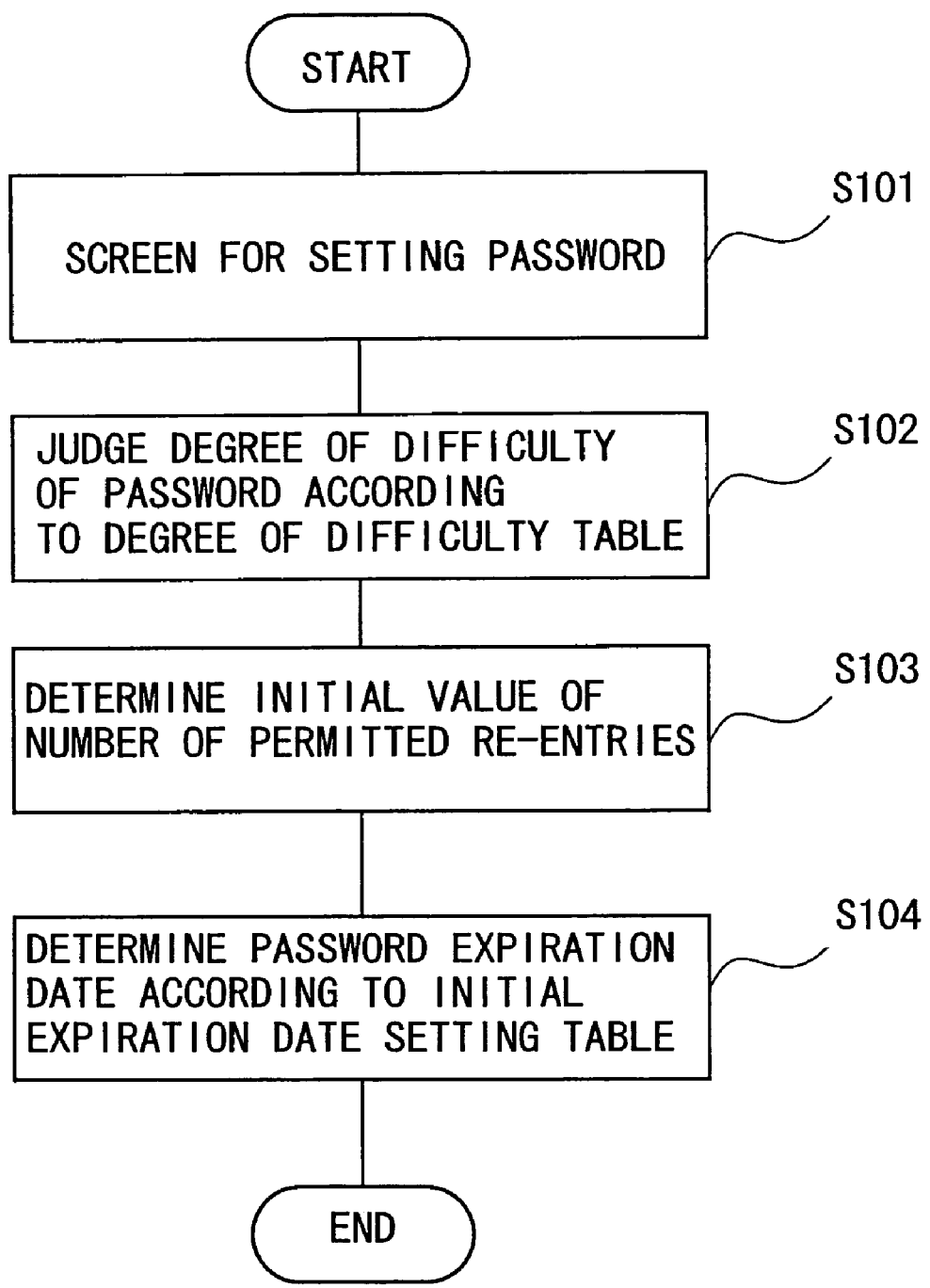
FIG. 2 is an example flowchart for determining the initial number of permitted re-entries and an initial expiration date of a password according to the first embodiment.

FIG. 2 is a flowchart for describing the password setting process of the embodiment.

Figure 3:
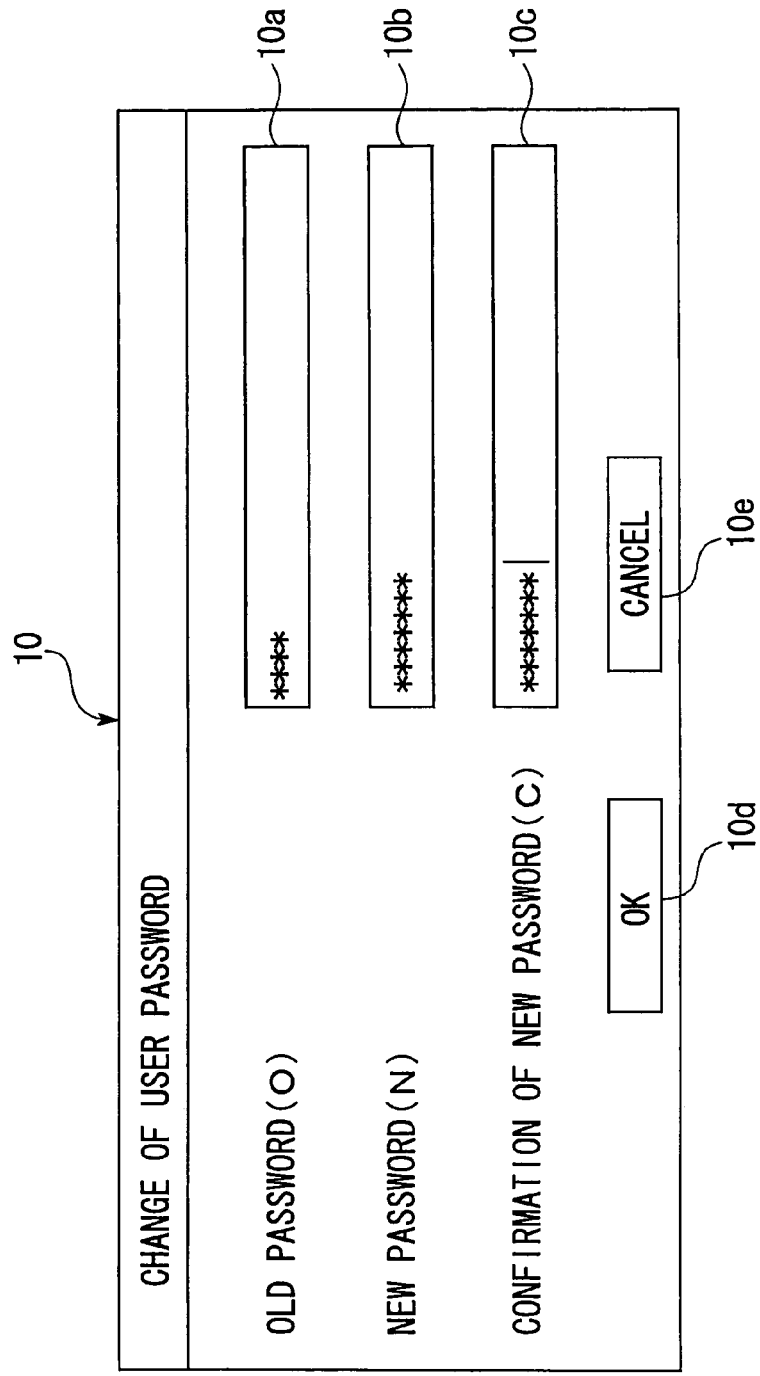
FIG. 3 is an example of a password entry screen according to the first embodiment.

First, the device 100 displays on the display 106 a screen for setting a password and requests a user to set a password for use of the device 100 (step 101 in FIG. 2: hereinafter referred to such as S101). FIG. 3 shows an example of the password setting screen 10. The password setting screen 10 contains an old password entry field 10*a*, a new password entry field 10*b*, a new password confirmation entry field 10*c*, an OK button 10*d*, and a cancel button 10*e*. In step 101, the user enters a previously initial setting password in the old password entry field 10*a*. In the embodiment, the user enters "0000" as the initial setting password, for example.

Subsequently, the user enters a new password in the new password entry field 10*b*. For example, the user enters "fro439us" as the new password. Then, in order to prevent a entering error of the new password, the user enters the new password again in the new password confirmation entry field 10*c*. After entering the new password in the new password confirmation entry field 10*c*, the user selects the OK button 10*d*, with such as a mouse.

The device 100 then judges the degree of difficulty of the password "fro439us" according to the degree-of-difficulty table in the database (S102). FIG. 4 shows an example of the degree-of-difficulty table 1. The degree-of-difficulty table 1 previously stores entered password values 1*a* in association with degrees of difficulty 1*b*. Since the password "fro439us" is formed of a combination of eight alphabetic and numeric characters, the password corresponds to the degree of difficulty "5" in the degree-of-difficulty table 1 of the embodiment. The correspondence between the password value 1*a* and the degree of difficulty 1*b* in the degree-of-difficulty table 1 is not limited to the example of the embodiment but can be set in various ways.

Next, according to the degree of difficulty, the device 100 determines an initial number of permitted re-entries of the password "fro439us" (S103). The degree-of-difficulty table 1 stores initial numbers of permitted re-entries in association with the degrees of difficulty 1*b* of the entered password values 1*a*. The initial number of permitted re-entries of the password "fro439us" is "5". The correspondence between the degree of difficulty 1*b* and the initial number of permitted re-entries 1*c* in the degree-of-difficulty table 1 is not limited to the example of this embodiment but can be set in various ways. For example, the relation between the degree of difficulty 1*b* and the initial number of permitted re-entries 1*c* may be defined in another table independently of the relation between the entered password value 1*a* and the degree of difficulty 1*b*.

Next, on the basis of the degree of difficulty, the device 100 determines the initial expiration date of the password "fro439us" according to the initial expiration date setting table in the database (S104).

FIG. 5 shows an example of the initial expiration date setting table 2. In the initial expiration date setting table 2, stores the degree of difficulty 2*a* and the initial expiration date 2*b* are stored in association with each other. Since the degree of difficulty of the password "fro439us" is "5", the initial expiration date of the password is "six months". The correspondence between the degree of difficulty 2*a* and the initial expiration date 2*b* in the initial expiration date setting table 2 is not limited to the example of the embodiment but can be set in various ways.

Through these steps, the device 100 becomes available by entrying of the password. The degree-of-difficulty data, the expiration date data, and the initial number of permitted re-entries data about the password "fro439us" are stored in the database of the storage device 104 in association with the corresponding password user.

FIG. 6 shows an example of a user data table for storing the data about individual users. In the user data table, the degree-of-difficulty data, the expiration date data, the initial permitted re-entry number data, and the password are related to each user. The authentication information processing device 100 refers to the user data table and judges the password expiration date, the initial number of permitted re-entries, and the like when authenticating the user.

<Process of Judging Entered Password>

Next, a process of judging a password entered into the device 100 according to the embodiment will be described. The entered password judging process corresponds to the authentication information comparing unit, the judgement unit, the permitted re-entry number determining unit, and the expiration date determining unit of the present invention.

Figure 7:
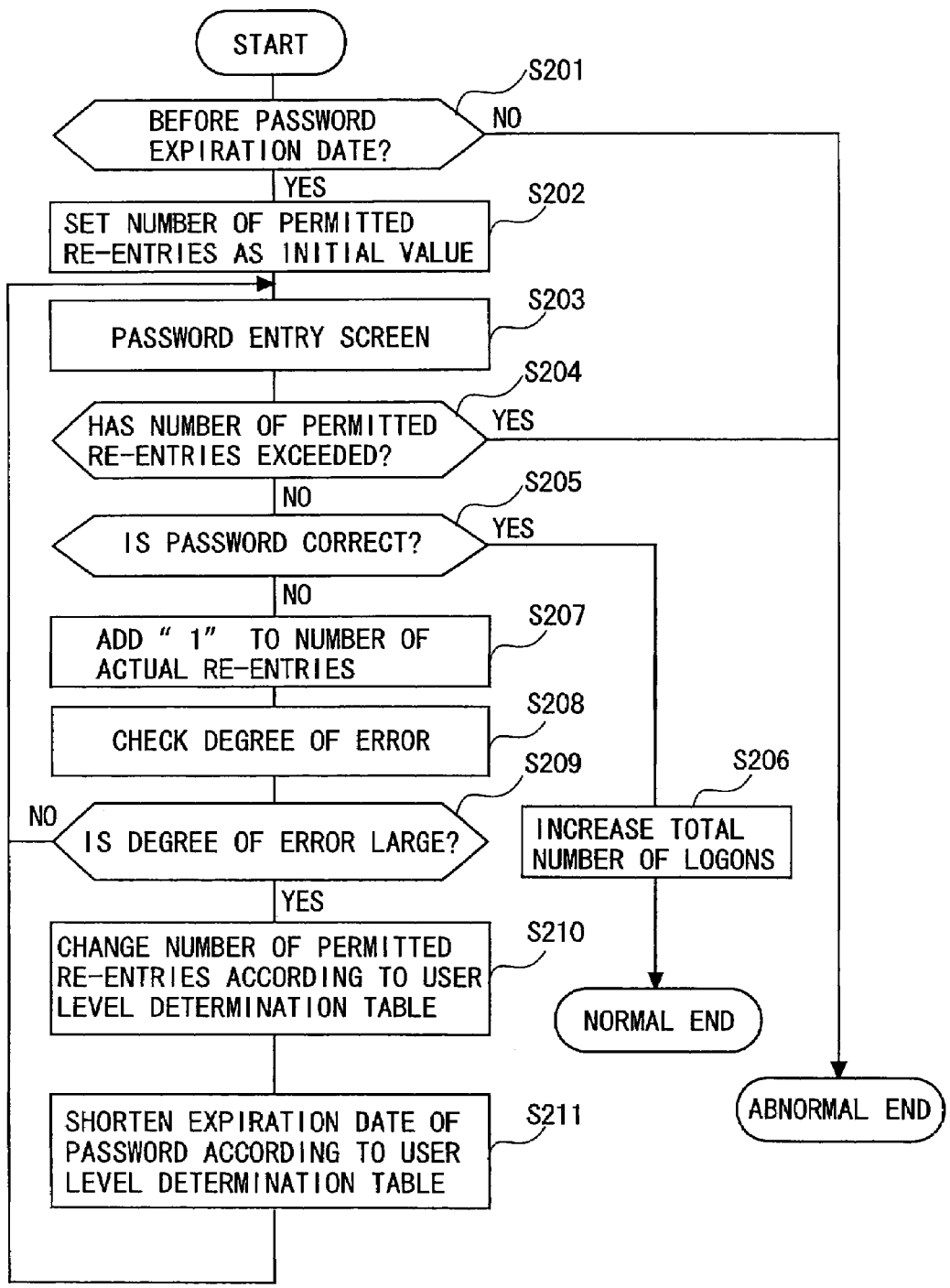
FIG. 7 is a flowchart for determining an entered password according to the first embodiment.

FIG. 7 shows a flowchart of the entered password judging process of the embodiment.

First, the device 100 prompts the user to enter the user name (not shown). Next, the device 100 refers to the user data table on the basis of the user name. The device 100 then judges whether the validity of the entered password has already expired. That is, the device 100 refers to the expiration date data, according to the user name, stored in the user data table in the database and judges whether or not the expiration date of the user's password has already passed (step 201 in FIG. 7: hereinafter referred to such as S201). When judging that the expiration date of the user's password has already passed in step 201, the device 100 brings the process to an abnormal end.

Next, the device 100 retrieves the initial number of permitted re-entries corresponding to the password from the database and sets the initial number of permitted re-entries as an initial value (S202).

Then the device 100 presents a password entry screen on the display 106 to request the user to enter the password (S203).

The device 100 thus accepts the entry of the password from the password entry screen and judges whether the number of re-entries of the password exceeds the initial number of permitted re-entries on the basis of data in the database (S204). When the number of re-entries of the password has been over the initial number of permitted re-entries in the step 204, the device 100 brings the process to an abnormal end.

When the number of re-entries does not exceed the initial number of permitted re-entries in step 204, the device 100 judges whether the entered password is a correct password (S205). When the step 205 judges that the entered password is correct, the device 100 adds the total number of logons made until now and stores the number of logons in the database in association with each password (S206) and normally ends the process. For example, the number of logons may be stored in association with the password (user name) in the user data table of FIG. 6.

When step 205 judges that the entered password is not correct, the device 100 adds "1" to the number of re-entries of the password (S207).

Next, the device 100 performs process to confirm the degree of error of the password judged as incorrect (S208). The process of confirming the degree of error of the password will be described later.

Next, the device 100 judges whether the degree of error of the password, judged in step 208, is large or not (S209) When the step 209 judges that the degree of error is large, the device 100 performs step 210 and step 211. When the step 209 judges that the degree of error is not large, the device 100 goes back to a process of step 203 to request again the user to enter the correct password.

In this embodiment, when the degree of error is large, the authentication information processing device 100 judges that the number of permitted re-entries and the expiration date of the password should be changed. Then the authentication information processing device 100 refers to the degree of error and the user level judging table to change the number of permitted re-entries and the expiration date of the password.

Figure 8:
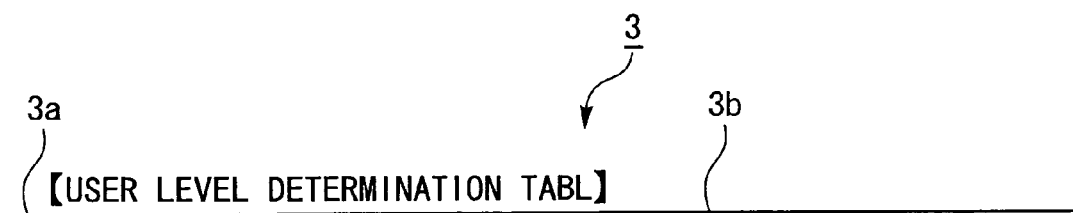
FIG. 8 is an example of a user level table used to determine the level of experience of a password user according to the first embodiment.

FIG. 8 shows an example of the user level determination table that is referred to when changing the number of permitted re-entries and the expiration date of the password. The user level determination table 3 stores user levels 3b in correspondence with the total numbers of logons 3a. In the user level determination table 3, the total number of logons 3a is used in a reference using the total number of times that the user logged on by entering the correct password.

In this embodiment, the degree of experience of the user is judged on the basis of the user level 3b.

In general, a user who has logged on for a smaller total number of times is judged as a user with a lower degree of experience, i.e., as a lower-level user (e.g., an inexperienced user). On the other hand, a user who has logged on for a larger total number of times is judged as a user with a higher degree of experience, i.e., a higher-level user (e.g., an advanced user).

When step 209 judges that the degree of error is large, the device 100 refers to the user level determination table in the database and changes the number of permitted re-entries of the password of the user (S210).

In step 210, since an inexperienced user, for example, is more likely to make entry errors, the device 100 subtracts a smaller number from the number of permitted re-entries of the user's password. On the other hand, since an advanced user is less likely to make entry errors, the device 100 subtracts a larger number from the number of permitted re-entries of the user's password. The number subtracted from the number of permitted re-entries is determined as below, for example. With an inexperienced user, the number of permitted re-entries is reduced by one for every three entry errors, and with an advanced user, the number of permitted re-entries is reduced by two for every single entry error. The number to be subtracted from the number of permitted re-entries is not limited to the above example and can be appropriately determined in any way.

Also, the device 100 changes the expiration date of the password by referring to the user level determination table (S211).

In step 211, for example, with an inexperienced user, who is likely to make entry errors, the device 100 narrows the range of shortening the expiration date of the password by a shorter period. On the other hand, with an advanced user, who is less likely to make entry errors, the device 100 widens the range of shortening the expiration date of the password by a longer period. The range of shortening the expiration date is determined as follows, for example. With an inexperienced user, the expiration date is shortened by one week for each entry error, and with an advanced user, the expiration date is shortened by one month for each entry error. The values are just examples and the range of shortening the expiration date may be determined in any appropriate way.

When the device 100 ends a process of step 211, the device 100 goes back to a process of step 203 to request again the user to enter the correct password.

<Process of Judging Degree of Error>

Next, the process of judging the degree of error of a password entered into the device 100 according to the embodiment will be described. This process corresponds to the judgement unit of the present invention.

Figure 9:
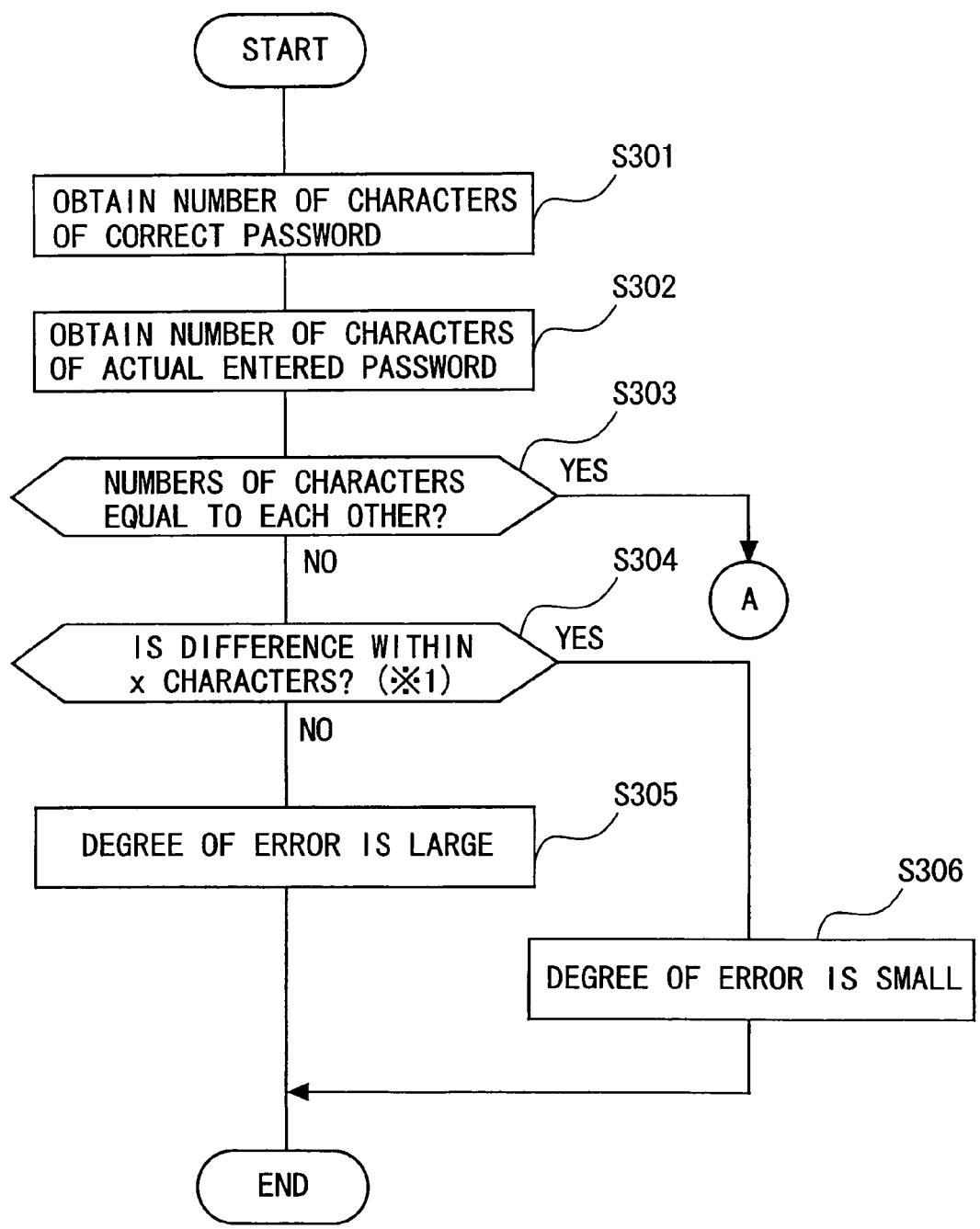
FIG. 9 is a flowchart for determining the level of error of an entered password according to the first embodiment.
Figure 10:
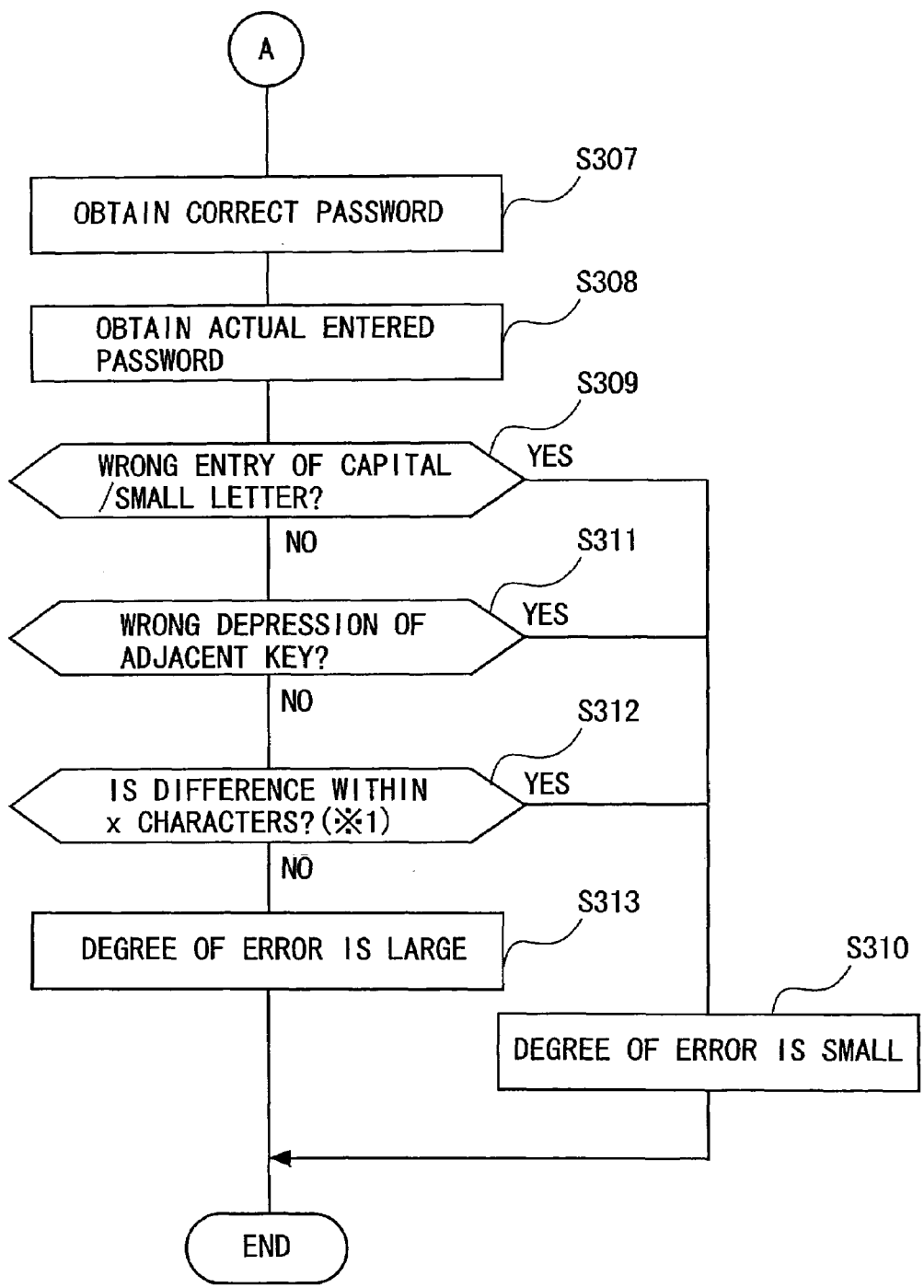
FIG. 10 is a flowchart for determining the level of error of an entered password according to the first embodiment.

FIGS. 9 and 10 are flowcharts for describing the process by which the device 100 judges the degree of error of an entered password.

First, in the above step 208 in the password judging process, the device 100 performs a process of judging the degree of error of the entered password. At this time, the device 100 obtains, from the user data table, on the basis of the user name, data indicating the correct number of characters of the entered password (step 301 in FIG. 9: hereinafter referred to such as S301).

Next, the device 100 obtains data indicating the number of characters of the actually entered password, from such as the main memory 102 that temporality stores the data about the number of characters (S302).

Then, the device 100 checks whether the data about the correct number of characters of the password stored in the user data table coincides with the number of characters of the actually entered password (S303). When the two numbers are equal, the device 100 moves to a process of step 307 (FIG. 10), and when they are not equal, the device 100 moves to a process of step 304.

When the above step 303 judges that the correct number of characters of the password stored in the user data table is not equal to the number of characters of the actually entered password, then the device 100 checks whether the error of the actually entered password is within a predetermined number of characters (S304). For example, with the 8-character password "fro439us", the step 304 judges whether the error of the actual entry is within four characters. In this process of judging whether the error is within a predetermined number of characters, the predetermined number of characters can be appropriately varied according to the total number of characters of the password and the types of characters used. That is, such a predetermined number of characters, may be registered in the database.

As a result of a process of step 304, when the number of the actually entered characters is over the predetermined number of characters, the device 100 judges that the degree of error is large (S305), and when the number of the actually entered characters is within the predetermined number of characters, the device 100 judges that the degree of error is small (S306). After judging the degree of error, the device 100 ends this process.

When the step 303 described above judges that the correct number of characters of the password stored in the user data table is equal to the number of characters of the actually entered password, the device 100 obtains, from the database, the data of the correct password "fro439us" that corresponds to the user name (S307). Then, the device 100 obtains the data of the actually entered password from such as the main memory 102 and so on temporarily storing the data (S308).

Then the device 100 judges whether the differences of the password obtained in step 308 are the differences of a capital letter and a small letter of alphabet (S309). In this step, when the difference between the two passwords is the difference of a capital letter and small letter, then the device 100 judges that the degree of error is small (S310) and ends the process.

When step 309 judges that the difference between the two passwords is not the difference of a capital letter and small letter, the device 100 judges whether the different characters correspond to keys placed adjacent on the keyboard 107 (S311). At this time, when the difference of the two passwords correspond to adjacent keys on the keyboard 107, the device 100 judges that the degree of error is small (S310) and ends the process. After finishing the process of judging the degree of error, the authentication information processing device 100 goes back to the entered password judging process shown in FIG. 7. Then, when the degree of error has been judged to be large, the authentication information processing device 100 performs the process of changing the number of permitted re-entries and the expiration date of the password.

The judgement as to whether the error corresponds to adjacent characters on the keyboard 107 is achieved as follows, for example. The authentication information processing device 100 previously holds, in the storage device 104 and so on, information about relations between target characters and characters of adjacent keys. The authentication information processing device 100 may process each character of the entered password using the relation information.

When step 311 judges that the difference between the two passwords does not correspond to adjacent keys on the keyboard 107, the device 100 judges whether the difference between the two passwords is within a predetermined number of characters (S312). For example, with the 8-character password "fro439us", the step 314 judges whether or not the error of the actual entry is within four characters. In the process of judging whether the error is within the predetermined number of characters, the predetermined number of characters can be appropriately changed according to the total number of characters of the password and the types of characters used. Also, the predetermined number of characters can be registered in the database, as in step 304 of FIG. 9. However, the predetermined number of characters used in step 304 of FIG. 9 and the predetermined number of characters used in step 312 of FIG. 10 do not have to be the same.

Thus, with the result of process of step 312, when the error of the actual entry is over the predetermined number of characters, the device 100 judges that the degree of error is large (S313), and when the error of the actual entry is within the predetermined number of characters, the device 100 judges that the degree of error is small (S310). After judging the degree of error, the device ends this process.

Effects of the First Embodiment

Implementing the authentication information processing of the embodiment provides the effects below.

According to the authentication information processing device of the embodiment, the degree of difficulty of the authentication information, the initial number of permitted re-entries, and the initial expiration date are set on the basis of the number of setting characters of the authentication information, the types of characters used, etc., which makes it possible to keep the security while improving the convenience of users of the authentication information.

Also, according to the authentication information processing device of the embodiment, when wrong authentication information is entered, the number of re-entries of the authentication information is increased and the expiration date is set at an earlier date on the basis of the initial expiration date and the initial number of permitted re-entries of the entered authentication information, thereby keeping the security of the authentication information.

Further, according to the authentication information processing device of the embodiment, the user level is judged on the basis of the number of past logons and the number of permitted re-entries and the expiration date of the authentication information are set on the basis of the user level, which makes it possible to keep the security of the authentication information while improving the convenience of users.

In addition, according to the authentication information processing device of the embodiment, the degree of error of entered authentication information is judged on the basis of the number of entered characters, the number of mismatched characters, difference of a capital/small letter, and keystroke error, and the number of re-entries of the authentication information is increased and the expiration date is set at an earlier date in accordance with the degree of error, thereby keeping the security of the authentication information.

Furthermore, the authentication information processing by the authentication information processing device of the embodiment is executable also in systems accessed by a large number of users, in servers of ASP (Application Service Providers), and in Web sites.

Second Embodiment

A second embodiment of the present invention will be described referring to FIGS. 11 and 12. The first embodiment applies the authentication information processing method of the present invention to an authentication information process using such as a computer and so on. The second embodiment applies the authentication information processing method of the present invention to a check of a PIN (Personal Identification Number) with a smart card connected to a computer. The same components as those of the first embodiment are denoted by the same reference symbols and are not described again here.

Figure 11:
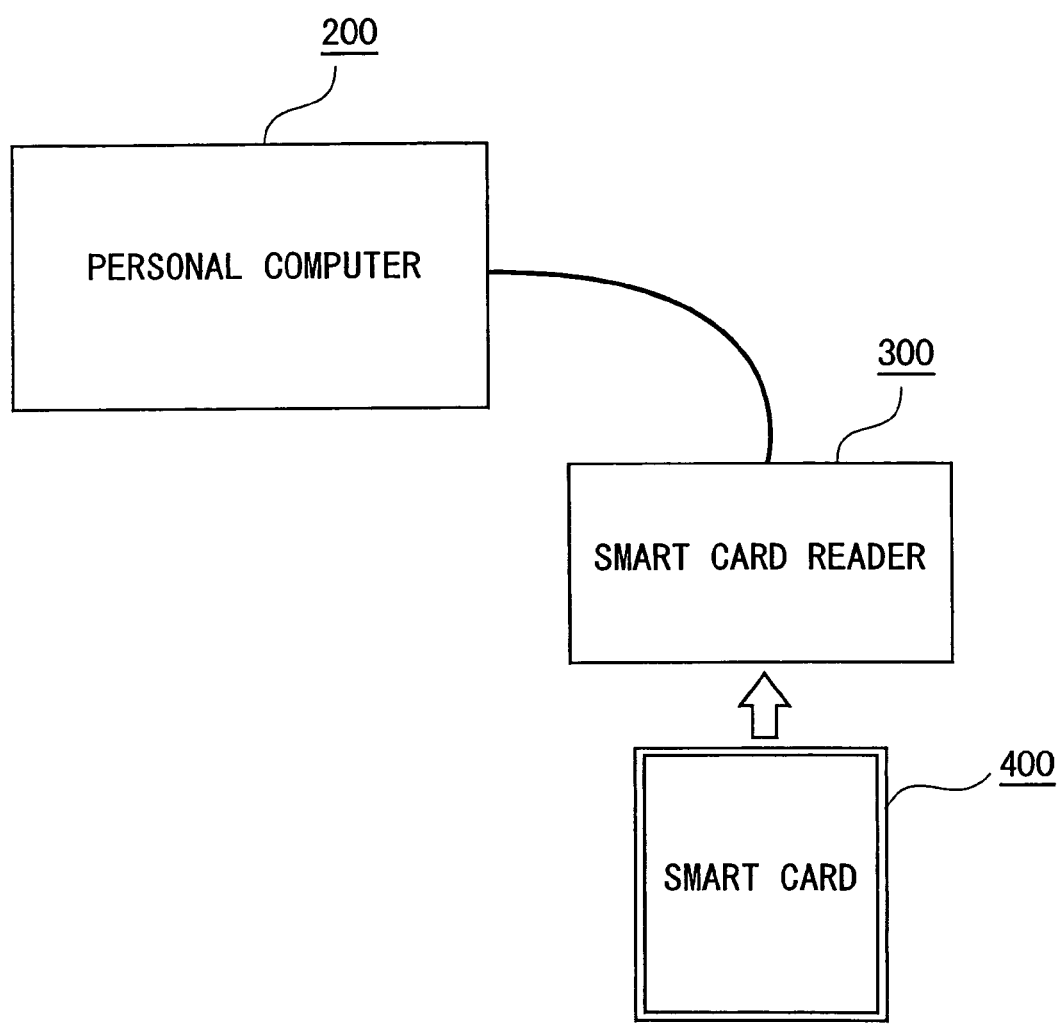
FIG. 11 is an example outlined configuration in which a smart card is used in a computer according to a second embodiment.

FIG. 11 shows a schematic example configuration of the case of using a smart card in a computer in the second embodiment. A computer 200 connects with a smart card 400 through a smart card reader 300.

The smart card is a plastic card with a built-in IC chip, including a CPU, memory, security circuitry, etc. The smart card may be called an IC card. The structure and functions of the smart card are well known and so not described in detail herein.

The smart card reader 300 is an interface for making a connection with the smart card 400 when the smart card 400 is used in the computer 200. A type of the smart card reader 300 can be cited one which makes an external connection through a USB (Universal Serial Bus), an RS-232C connector, etc., one in which the computer 200 may be previously equipped with a smart card connection unit, or the like.

When the authentication information processing method of the present invention is used in a check process of the smart card 400, a check process of a PIN is performed in the smart card 400. The smart card 400 stores a set correct PIN. In the checking process of the PIN, the computer 200 provides an entered PIN to the smart card 400. The smart card 400 compares the entered PIN with the predetermined PIN. After the completion of check of the PIN, the computer 200 can read information from the smart card 400. The degree-of-difficulty table 1, the initial expiration date setting table 2, the user level determination table 3, etc. described in the first embodiment can be stored in memory in the smart card 400.

<Process of Checking Entered PIN>

Next, a process of checking an entered PIN in the device 200 according to the embodiment will be described. The entered PIN check process corresponds to the authentication information comparing unit, the judgement unit, the permitted re-entry number determining unit, and the expiration date determining unit of the present invention.

Figure 12:
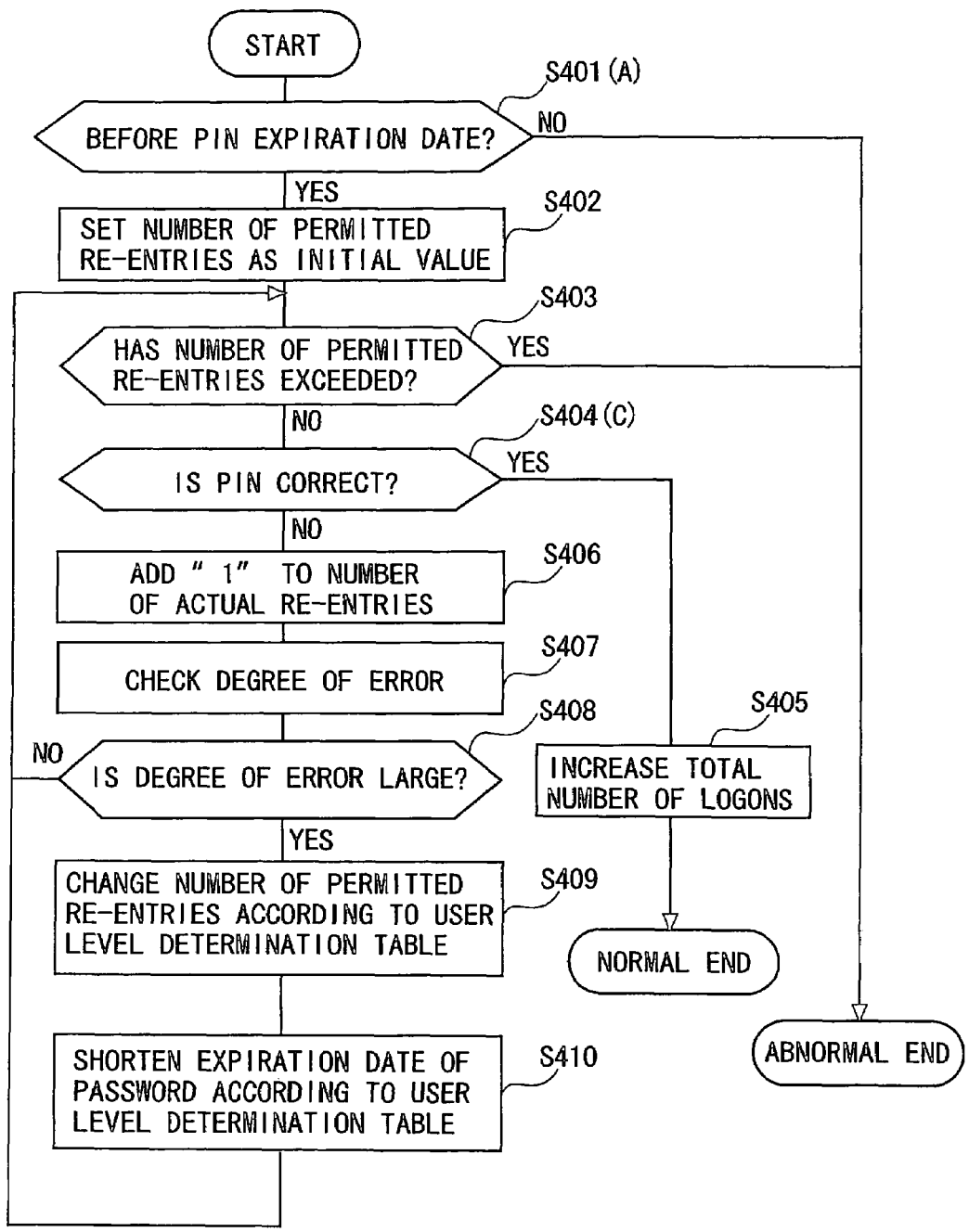
FIG. 12 is a flowchart for determining an entered PIN according to the second embodiment.

FIG. 12 is a flowchart used to describe the entered PIN check process of this embodiment.

First, the device 200 prompts a user to enter a PIN (not shown) Then, the device 200 supplies the entered PIN to the smart card 400. The smart card 400 checks whether or not the expiration date of the entered PIN has passed. That is, the smart card 400 refers to the expiration date data about the PIN that is stored in the smart card 400 and checks whether or not the expiration date of the PIN has passed (step 401 in FIG. 12: hereinafter referred to such as S401). When step 401 judges that the expiration date of the PIN of the user has already passed, the smart card 400 brings the process to an abnormal end.

Next, the smart card 400 retrieves the initial number of permitted re-entries of the PIN from the database and sets the initial number of permitted re-entries as an initial value (S402).

Then the smart card 400 checks whether or not the number of re-entries of the entered PIN exceeds the initial number of permitted re-entries on the basis of data stored in the smart card 400 (S403). When the step 403 judges that the number of re-entries of the PIN has been over the initial number of permitted re-entries, the smart card 400 brings the process to an abnormal end.

When step 403 judges that the number of re-entries does not exceed the initial number of permitted re-entries, the device 200 checks whether the entered PIN is a correct one or not (S404). When the step 404 judges that the entered PIN is correct, the smart card 400 increases the total number of past logons, stores the number of logons (S405), and normally ends the process.

When step 404 judges that the entered PIN is not correct, the smart card 400 adds "1" to the number of re-entries of the PIN (S406).

Next, the smart card 400 performs a process of confirming the degree of error of the PIN judged as incorrect (S407). The process of checking the degree of error of the PIN is not described here because it is similar to the process of judging the degree of error of a PIN described earlier (see the flowcharts of FIGS. 9 and 10).

Next, the smart card 400 checks whether the degree of error of the PIN, judged in step 407, is large or not (S408). When the step 408 judges that the degree of error is large, the smart card 400 performs a process of step 409 and step 410. When step 408 judges that the degree of error is not large, the smart card 400 goes back to a process of step 403 to request again the user to enter the correct PIN.

In this embodiment, when the degree of error is large, the smart card 400 judges that the number of permitted re-entries and the expiration date of the PIN should be changed. Then the smart card 400 refers to the degree of error and the user level determination table and changes the number of permitted re-entries and the expiration date of the PIN. The process of changing the number of permitted re-entries and the expiration date of the PIN is not described here because it is similar to the process of changing the number of permitted re-entries and the expiration date of the PIN described earlier (see FIG. 8).

When step 408 judges that the degree of error is large, the smart card 400 refers to the user level determination table in the smart card 400 and changes the number of permitted re-entries of the PIN of the user (S409).

The process of step 409 is not described here because it is similar to step 210 of FIG. 7 described in the first embodiment.

The smart card 400 changes the expiration date of the PIN by referring to the user level determination table (S410).

The process of step 410 is not described here because it is similar to step 211 of FIG. 7 in the first embodiment.

When the smart card 400 ends a process of step 410, the smart card 400 goes back to a process of step 403 to request again the user to enter the correct PIN.

Effects of the Second Embodiment

The second embodiment provides the same effects as the first embodiment in the process of checking the PIN of the smart card.

<Modifications>

The embodiments have described the authentication information processing method of the present invention mainly about processing of a password which is an example of authentication information, but the present invention is not limited to the embodiments and is generally applicable to processes of a wide variety of authentication information.

Also, the embodiments have described the authentication information processing method of the present invention with an example in which an authentication information processing program is installed in a computer and the computer is used as the authentication information processing device. However, the present invention is not limited to the embodiments and, of course, numerous other modifications and variations can be devised without departing from the gist of the present invention.

For example, the present invention can be implemented in the manners shown below.

The authentication information processing method of the present invention is applicable to authentication information processing used to authenticate users for use of various kinds of application software used in computers.

Also, the authentication information processing method of the present invention is applicable to user authentication performed at start-up of various operation systems (OS) used in computers.

Furthermore, the authentication information processing method of the present invention is applicable also to user authentication for access to particular Web pages in a general-purpose network such as the Internet and so on.

In addition, the authentication information processing method of the present invention is applicable to user authentication processes that involve entry of various kinds of authentication information.

Also, in the embodiments, when the degree of error is large, the number of permitted re-entries and the expiration date are changed on the basis of the user level, but the present invention is not limited to the embodiments. For example, irrespective of the user level, the number of permitted re-entries may be subjected to such as subtraction or division, etc., (e.g., subtracting one time) when the degree of error is large. Also, irrespective of the user level, the expiration date may be set at an earlier date (e.g. by one week) when the degree of error is large.

Furthermore, the embodiments judge the user level on the basis of the number of logons and change the number of permitted re-entries and the expiration date of the authentication information according to the user level. However, alternatively, the number of permitted re-entries and the expiration date of the authentication information may be changed directly from the number of logons.

INDUSTRIAL APPLICABILITY

The authentication information processing method of the present invention offers the outstanding effect of providing an authentication information processing technique that protects authentication information from being broken while offering enhanced convenience to right users of the authentication information.

What is claimed is:

1. An authentication information processing method, comprising:
    accepting an entry of authentication information;
    comparing the accepted authentication information with previously set authentication information;
    judging a degree of error between the accepted authentication information and the previously set authentication information based on a result of the comparison between the accepted authentication information and the previously set authentication information; and
    determining a number of possible re-entries of the authentication information and an expiration date of the authentication information in accordance with the judged degree of error.

2. The authentication information processing method according to claim 1, further comprising judging a degree of difficulty of the authentication information based on a number of characters and combination way of characters of the previously set authentication information,
    wherein said determining of the number of possible re-entries determines an initial number of possible re-entries of the authentication information based upon a higher degree of difficulty determining a larger initial number.

3. The authentication information processing method according to claim 2, further comprising determining an initial expiration date of the authentication information based upon the higher degree of difficulty of the authentication information determining a longer initial expiration date.

4. The authentication information processing method according to claim 3, wherein said determining of the number of possible re-entries is according to an accumulated number of entries of the authentication information.

5. An authentication information processing method, comprising:
    accepting an entry of authentication information;
    comparing the accepted authentication information with previously set authentication information;
    judging a degree of error between the accepted authentication information and the previously set authentication information based on a result of the comparison between the accepted authentication information and the previously set authentication information; and
    determining an expiration date of the authentication information in accordance with the accumulated number of entries of the authentication information.

6. A computer readable medium having a program stored therein for causing a computer to execute operations comprising:
    accepting an entry of authentication information;
    comparing the accepted authentication information with previously set authentication information;
    judging a degree of error between the accepted authentication information and the previously set authentication information based on a result of the comparison between the accepted authentication information and the previously set authentication information; and
    determining a number of possible re-entries of the authentication information and an expiration date of the authentication information in accordance with the judged degree of error.

7. The computer readable medium having the program stored therein for causing the computer to execute the operations according to claim 6, further comprising judging a degree of difficulty of the authentication information based on a number of characters and a combination way of characters of the previously set authentication information,
    wherein said determining of the number of possible re-entries determines an initial number of possible re-entries of the authentication information based upon a higher degree of difficulty determining a larger initial number.

8. The computer readable medium having the program stored therein for causing the computer to execute the operations according to claim 7, further comprising determining an initial expiration date of the authentication information based upon the higher degree of difficulty of the authentication information determining a longer initial expiration date.

9. The computer readable medium having the program stored therein for causing the computer to execute the operations according to claim 8, wherein said determining of the number of possible re-entries is according to an accumulated number of entries of the authentication information.

10. A computer readable medium having a program stored therein for causing a computer to execute operations comprising:
    accepting an entry of authentication information;
    comparing the accepted authentication information with previously set authentication information;
    judging a degree of error between the accepted authentication information and the previously set authentication information based on a result of the comparison between the accepted authentication information and the previously set authentication information; and determining an expiration date of the authentication information in accordance with the accumulated number of entries of the authentication information.

11. An authentication information processing device, comprising:

an authentication information entering unit accepting an entry of authentication information;

authentication information comparing unit comparing the accepted authentication information with previously set authentication information;

a judging unit judging a degree of error between the accepted authentication information and the previously set authentication information based on a result of the comparison between the accepted authentication information and the previously set authentication information;

a possible re-entry number determining unit determining a number of possible re-entries of the authentication information in accordance with the judged degree of error; and an expiration date determining unit determining an expiration date of the authentication information in accordance with the judged degree of error.

12. The authentication information processing device according to claim 11, further comprising a degree-of-difficulty judging unit judging a degree of difficulty of the authentication information based on a number of characters and a combination way of characters of the previously set authentication information, wherein said possible re-entry number determining unit determines an initial number of possible re-entries of the authentication information based upon a higher degree of difficulty determining a larger initial number.

13. The authentication information processing device according to claim 12, wherein said expiration date determining unit determines an initial expiration date of the authentication information based upon the higher degree of difficulty judged by said degree-of-difficulty judging unit determining a longer initial expiration date.

14. The authentication information processing device according to claim 13, wherein said possible re-entry number determining unit determines the number of possible re-entries of the authentication information in accordance with an accumulated number of entries of the authentication information.

15. An authentication information processing device comprising:

an authentication information entering unit accepting an entry of authentication information;

authentication information comparing unit comparing the accepted authentication information with previously set authentication information;

a judging unit judging a degree of error between the accepted authentication information and the previously set authentication information based on a result of the comparison between the accepted authentication information and the previously set authentication information; and an expiration date determining unit determining an expiration date of the authentication information in accordance with the accumulated number of entries of the authentication information.

\* \* \* \* \*